Figure 1:
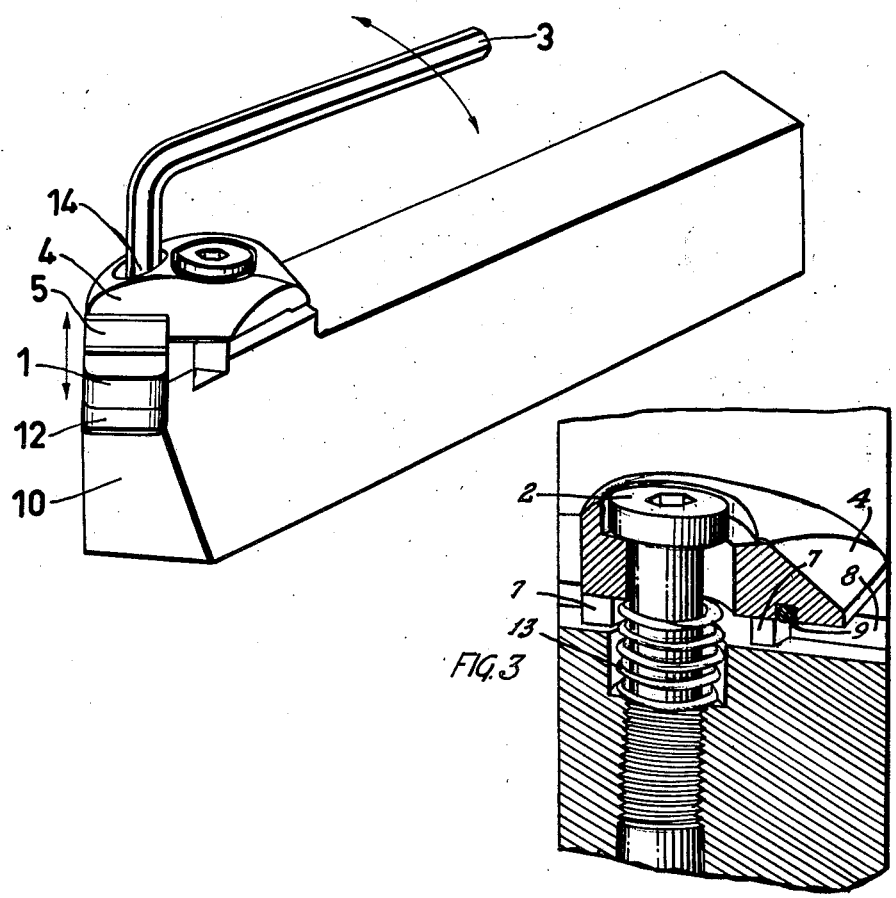

June 29, 1965 M. W. GUSTAFSON 3,191,262
METAL CUTTING TOOL WITH ADJUSTABLE CHIP BREAKER
Filed July 30, 1962 2 Sheets-Sheet 1

Inventor
Manfred W. Gustafson
by Sommers Young
Attorneys

June 29, 1965 M. W. GUSTAFSON 3,191,262
METAL CUTTING TOOL WITH ADJUSTABLE CHIP BREAKER
Filed July 30, 1962 2 Sheets-Sheet 2

Inventor
Manfred W. Gustafson
by Somners-Young
Attorneys

United States Patent Office 3,191,262
Patented June 29, 1965

---

3,191,262
METAL CUTTING TOOL WITH ADJUSTABLE CHIP BREAKER
Manfred Wallace Gustafson, Fagersta, Sweden, assignor to Fagersta Bruks Aktiebolag, Fagersta, Sweden, a joint-stock company of Sweden
Filed July 30, 1962, Ser. No. 213,532
Claims priority, application Sweden, Aug. 2, 1961, 7,889/61
4 Claims. (Cl. 29—96)

When hard metal, ceramic material or the like is employed for metal cutting work it is known to utilize this material in the form of a cutting bit and to make the bit part of a tool in that the cutting bit is detachably mounted on a holder. It is known to place a chip breaker above the cutting bit, and it is also known to clamp chip breaker and cutting bit in operating position on the tool holder by means of a clamp mounted above the cutting bit and chip breaker. In connection therewith, it is further known to arrange the chip breaker such that it is adjustable in a direction perpendicular to the cutting edge.

Previously known tool constructions, however, do not allow adjustment of the said chip breaker in a simple manner other than stepwise. The tool according to this invention includes the advantage of a chip breaker which, to be accurately adjusted to prevailing conditions can be adjusted variably in a direction perpendicular to the cutting edge.

This invention relates, thus, to a tool of the aforesaid type, that is, a tool for metal cutting work comprising a tool holder, a cutting bit of hard metal, ceramic material or the like detachably mounted on the holder, an adjustable chip breaker mounted above the cutting bit, and a clamp located above the cutting bit and the chip breaker for clamping the cutting bit in operating position. The tool according to the invention is substantially characterized in that the clamp is adapted for variable displacement in a direction perpendicular to the cutting edge by means of an eccentric, and that the chip breaker is arranged to participate in the said displacement of the clamp.

It is most advantageous when the chip breaker is adapted for continuous displacement in relation to the cutting bit in all directions of the plane, thus even parallel with the cutting edge, as this renders it possible to adjust the setting of the chip breaker in the best manner to the shape of the cutting bit and to actual conditions. When operating with large nose radius of the cutting bit and small feed, the chip breaker shall, thus, be drawn back such a distance into the direction parallel with the cutting edge that its front edge does not project beyond the cutting bit at the nose radius of the latter. When operating with a small nose radius in combination with small feed and low cutting depth, the chip breaker is, however, displaced forwards such a distance, that chips cannot pass in front thereof.

In an embodiment which has proved suitable, the chip breaker is detachably mounted on the clamp which in its turn is detachably mounted on the holder by a clamping screw or the like. For mounting or exchange of the cutting bit, for example, the clamp may be released by loosening the said clamping screw without causing the chip breaker to change its position in relation to the clamp. After having loosened the clamping screw, the clamp may be displaced by means of the eccentric in a direction perpendicular to the cutting edge, the chip breaker thereby following along with the clamp. The chip breaker is preferably retained on the clamp with the help of a "fixing pin," which is a long means extending substantially parallel with the cutting edge and being preferably resilient. In this manner, it is possible to displace the chip breaker in a direction parallel with the cutting edge into the most suitable position.

Figure 2:
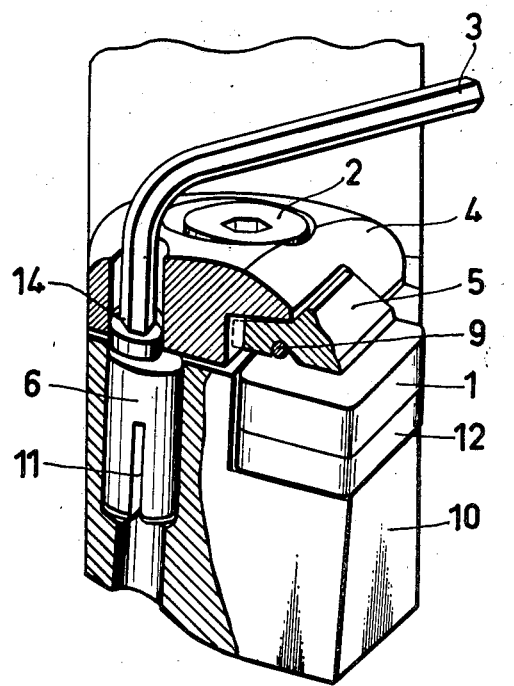

The invention will be described in greater detail in the following, reference being had to the accompanying drawings shown by way of example an embodiment of the invention, whereon FIG. 1 shows the tool viewed in perspective comprising an adjustment spanner in position for adjusting the clamp and the chip breaker in a direction perpendicular to the cutting edge, FIG. 2 is a section through the eccentric means for the said adjustment, FIG. 3 is a section through the arrangement for tightening the cutting bit by means of the clamp.

When the cutting bit 1 is to be loosened or the chip breaker 5 is to be reset into a direction perpendicular to the cutting edge, first the clamping screw 2 is loosened by the spanner 3 which in the embodiment shown is a detachable hexagon spanner also fitting the eccentric means. While loosening the clamping screw, the spring 13 lifts the clamp 4 which with the help of the fixing pin 9 forms a unit with the chip breaker 5, in such a manner, that the cutting bit 1 resting on a sole 12 of hard metal is released for being turned or exchanged.

For displacing the chip breaker 5 in a direction perpendicular to the cutting edge, the spanner 3 is moved to the hexagon hole 14 in the eccentric means 6. Thereafter the eccentric means is turned and moves the clamp 4, the movement of the clamp being guided by guiding heads 7 lodged in a groove 8. In view of the fact that, as mentioned above, the chip breaker 5 forms a unit with the clamp, it is hereby possible to obtain the desired adjustment of the chip breaker in a direction perpendicular to the cutting edge of the cutter 1. In order to effect a steady run of the eccentric 6 in the holder 10 and to prevent any change of its angular position other than by the spanner, an adjusted frictional resistance is produced by splitting and slotting the lower portion 11 of the eccentric.

The chip breaker 5 is displaced in the direction parallel with the cutting edge directly by hand while the clamping screw 2 is loosened. The chip breaker is thereby retained and guided in relation to the clamp by the fixing pin 9 the resilience of which is adjusted such, that suitable frictional resistance is produced.

What I claim is:

1. A tool for metal cutting work comprising a holder, a cutting bit of hard cutting material detachably mounted on said holder and having a top surface and a side surface intersecting each other and forming a cutting edge at said intersection, an adjustable chip breaker mounted above said cutting bit, and a clamp disposed above said cutting bit and said chip breaker for clamping the cutting bit and the chip breaker in their respective operative positions on said holder; eccentric means for displacing said clamp a variable amount in a direction perpendicular to said cutting edge; said chip breaker fixed to and forming a unit with said clamp by engagement means for making said chip breaker participate in said displacement of the clamp, leaving it free to be displaced to infinite positions through a limited range of adjustment relative to the clamp in a direction parallel to said cutting edge.

2. A tool according to claim 1, in which said clamp and chip breaker have grooves therein an said engagement means comprises a long fixing pin engaging in said grooves in said clamp and said chip breaker, respectively.

3. A tool for metal cutting work comprising a holder, a cutting bit of hard cutting material, said cutting bit having top and bottom surfaces, and a side surface intersecting said top and bottom surfaces and forming cutting edges at the lines of intersection thereof, means detachably mounting said cutting bit on said holder, a chip breaker disposed on top of said cutting bit, a sole underneath said cutting bit, and a clamp mounted on top of said chip breaker clamping said chip breaker and said cutting bit in operative position between said clamp and said sole; said clamp being mounted for variable positively-guided displacement perpendicularly of said cutting edges, when in operative position, by means of eccentric means; means coupling said chip breaker to said clamp so as to force said chip breaker to participate in said displacement but permitting said chip breaker to be displaced in relation to said clamp in a direction parallel to said cutting edge into an infinite number of positions within the range of adjustment.

4. A tool for metal cutting work according to claim 3 and a clamping screw engaging said holder and said clamp; said cutting bit being removable and reversible upside down to bring the different cutting edges into operative position, said coupling means being adapted to maintain the distance between the chip breaker and the cutting edge assuming the operative position.

References Cited by the Examiner

UNITED STATES PATENTS

| | | | |
|---|---|---|---|
| 2,210,605 | 8/40 | Speckert | 29—96 |
| 2,270,387 | 1/42 | Spector | 29—96 |
| 2,314,665 | 3/43 | Specht | 29—96 |
| 2,799,079 | 7/57 | Brigner | 29—96 |
| 2,967,345 | 1/61 | Novkov | 29—96 |

FOREIGN PATENTS

| | | |
|---|---|---|
| 1,208,907 | 9/59 | France. |
| 674,112 | 4/39 | Germany. |

OTHER REFERENCES

German printed patent, Klinglenberg, 1,085,746, July 1960.

WILLIAM W. DYER, JR., *Primary Examiner.*
LEON PEAR, *Examiner.*